(12) United States Patent
Masterson et al.

(10) Patent No.: US 9,125,037 B2
(45) Date of Patent: Sep. 1, 2015

(54) SYSTEM AND METHODS FOR DEFERRED AND REMOTE DEVICE BRANDING

(71) Applicant: Sprint Communications Company L.P., Overland Park, KS (US)

(72) Inventors: Michelle E. Masterson, Overland Park, KS (US); Dale S. Schempp, Lenexa, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 85 days.

(21) Appl. No.: 14/010,524

(22) Filed: Aug. 27, 2013

(65) Prior Publication Data

US 2015/0065105 A1 Mar. 5, 2015

(51) Int. Cl.
*H04M 1/66* (2006.01)
*H04W 8/20* (2009.01)

(52) U.S. Cl.
CPC .................................. *H04W 8/205* (2013.01)

(58) Field of Classification Search
CPC ............................... H04W 8/205; H04W 4/001
See application file for complete search history.

(56) References Cited

U.S. PATENT DOCUMENTS

| | | | |
|---|---|---|---|
| 6,131,024 A | 10/2000 | Boltz | |
| 7,165,191 B1 | 1/2007 | Vakrat | |
| 7,266,371 B1 | 9/2007 | Amin et al. | |
| 7,493,111 B2 | 2/2009 | Knowles | |
| 7,817,988 B2 | 10/2010 | Kruis et al. | |
| 7,904,895 B1 | 3/2011 | Cassapakis et al. | |
| 8,107,926 B2 | 1/2012 | Goto | |
| 8,185,101 B1 | 5/2012 | Wiseman et al. | |
| 8,260,281 B2 | 9/2012 | Urbanek | |
| 8,401,538 B2 | 3/2013 | Urbanek | |
| 8,401,595 B2 | 3/2013 | Zhu et al. | |
| 8,433,953 B1 | 4/2013 | Gaudette et al. | |
| 8,442,521 B2 | 5/2013 | Fleischman et al. | |
| 8,571,536 B2 | 10/2013 | Urbanek | |
| 8,612,967 B1 | 12/2013 | Delker | |
| 8,626,165 B1 | 1/2014 | Narasimhan et al. | |
| 8,666,383 B1 | 3/2014 | Mauer et al. | |

(Continued)

FOREIGN PATENT DOCUMENTS

WO WO2012078753 A1 6/2012
WO WO2013169983 A1 11/2013

(Continued)

OTHER PUBLICATIONS

Notice of Allowance dated Apr. 26, 2012, U.S. Appl. No. 12/962,620, filed Dec. 7, 2010.

(Continued)

*Primary Examiner* — Ronald Eisner (57) ABSTRACT

Methods and systems for delivering branding information to a portable electronic device based on a brand SKU. The brand SKU is assigned to a device in addition to or to replace an OEM SKU that may have been used for testing and traceability. Based on detection of a brand SKU and a determination as to what brand is associated with the brand SKU, upon power up downstream in the supply chain at the OEM, or at the distribution center, or at the point of sale, a brand payloads based on the brand SKU is sent to the portable electronic device. The brand payloads may comprise logos, configurable options, and access options for hardware and software to various network services including voice services and data services.

20 Claims, 6 Drawing Sheets

(56) References Cited

U.S. PATENT DOCUMENTS

| | | |
|---|---|---|
| 8,825,039 B2 | 9/2014 | Mizuguchi |
| 8,909,291 B1 | 12/2014 | Spanel et al. |
| 9,026,105 B2 | 5/2015 | Shipley et al. |
| 9,042,877 B1 | 5/2015 | Ghoshal et al. |
| 2002/0091931 A1 | 7/2002 | Quick, Jr. et al. |
| 2003/0217145 A1 | 11/2003 | Leung et al. |
| 2004/0033798 A1 | 2/2004 | Robin et al. |
| 2004/0092248 A1* | 5/2004 | Kelkar et al. ................ 455/411 |
| 2004/0093109 A1* | 5/2004 | O'Connor et al. ............ 700/117 |
| 2004/0116163 A1 | 6/2004 | Kim et al. |
| 2004/0137890 A1 | 7/2004 | Kalke |
| 2004/0137891 A1 | 7/2004 | Clark et al. |
| 2004/0261041 A1 | 12/2004 | Parakkuth et al. |
| 2005/0079855 A1 | 4/2005 | Jethi et al. |
| 2005/0085222 A1 | 4/2005 | Przybilski et al. |
| 2005/0119001 A1 | 6/2005 | Watanabe |
| 2005/0188262 A1 | 8/2005 | Rosenman et al. |
| 2005/0197098 A1 | 9/2005 | Trossen |
| 2006/0025151 A1 | 2/2006 | Karaoguz et al. |
| 2006/0135144 A1 | 6/2006 | Jothipragasam |
| 2006/0154651 A1 | 7/2006 | Knowles |
| 2006/0203722 A1 | 9/2006 | Oommen |
| 2006/0208071 A1 | 9/2006 | Chang et al. |
| 2006/0235944 A1 | 10/2006 | Haslam |
| 2006/0236325 A1 | 10/2006 | Rao et al. |
| 2006/0246949 A1 | 11/2006 | Gupta et al. |
| 2007/0004404 A1 | 1/2007 | Buckley et al. |
| 2007/0082655 A1 | 4/2007 | Link, II et al. |
| 2007/0099599 A1 | 5/2007 | Smith et al. |
| 2007/0129057 A1 | 6/2007 | Xu et al. |
| 2007/0130156 A1 | 6/2007 | U. Tenhunen et al. |
| 2007/0165654 A1 | 7/2007 | Chai et al. |
| 2007/0169084 A1 | 7/2007 | Frank et al. |
| 2007/0190939 A1 | 8/2007 | Abel |
| 2007/0197234 A1 | 8/2007 | Gill et al. |
| 2007/0250645 A1 | 10/2007 | Meadows et al. |
| 2007/0254635 A1 | 11/2007 | Montelius |
| 2008/0039114 A1 | 2/2008 | Phatak et al. |
| 2008/0046583 A1 | 2/2008 | Rao |
| 2008/0046880 A1 | 2/2008 | Jun et al. |
| 2008/0046997 A1 | 2/2008 | Wang |
| 2008/0062900 A1 | 3/2008 | Rao |
| 2008/0065753 A1 | 3/2008 | Rao |
| 2008/0109662 A1 | 5/2008 | Natarajan et al. |
| 2008/0146280 A1 | 6/2008 | Sasse et al. |
| 2008/0167027 A1 | 7/2008 | Gautier et al. |
| 2008/0171532 A1 | 7/2008 | Shieh et al. |
| 2008/0225806 A1 | 9/2008 | Arian et al. |
| 2008/0281511 A1 | 11/2008 | Miyata |
| 2008/0318547 A1 | 12/2008 | Ballou, Jr. et al. |
| 2009/0061840 A1 | 3/2009 | Fleischman et al. |
| 2009/0093242 A1 | 4/2009 | Bhalekar et al. |
| 2009/0094350 A1 | 4/2009 | Rive et al. |
| 2009/0106200 A1 | 4/2009 | Salinas et al. |
| 2009/0124250 A1 | 5/2009 | Topaltzas et al. |
| 2009/0156209 A1 | 6/2009 | Franklin et al. |
| 2009/0239518 A1 | 9/2009 | Feuillette |
| 2009/0247124 A1 | 10/2009 | de Atley et al. |
| 2009/0260004 A1 | 10/2009 | Datta et al. |
| 2009/0307763 A1 | 12/2009 | Rawlins et al. |
| 2010/0048193 A1 | 2/2010 | Ortion et al. |
| 2010/0060456 A1 | 3/2010 | Forster |
| 2010/0075669 A1 | 3/2010 | Sparks et al. |
| 2010/0080143 A1 | 4/2010 | Topaltzas et al. |
| 2010/0133335 A1 | 6/2010 | Maguid et al. |
| 2010/0136960 A1 | 6/2010 | Knezevic |
| 2010/0159876 A1 | 6/2010 | Brown et al. |
| 2010/0161724 A1 | 6/2010 | Sathyan et al. |
| 2010/0167696 A1 | 7/2010 | Smith et al. |
| 2010/0192120 A1 | 7/2010 | Raleigh |
| 2010/0203864 A1 | 8/2010 | Howard |
| 2010/0207742 A1 | 8/2010 | Buhot et al. |
| 2010/0222047 A1 | 9/2010 | Vanderlinden et al. |
| 2010/0262638 A1 | 10/2010 | Fitzgerald |
| 2010/0291898 A1 | 11/2010 | Sanding et al. |
| 2010/0311404 A1 | 12/2010 | Shi et al. |
| 2010/0312794 A1 | 12/2010 | Liu |
| 2010/0325622 A1 | 12/2010 | Morton |
| 2010/0332639 A1 | 12/2010 | Diaz et al. |
| 2011/0003590 A1 | 1/2011 | Yoon et al. |
| 2011/0014913 A1 | 1/2011 | Yoon et al. |
| 2011/0026501 A1 | 2/2011 | Sharaga et al. |
| 2011/0028138 A1 | 2/2011 | Davies-Moore et al. |
| 2011/0030062 A1 | 2/2011 | Hsu et al. |
| 2011/0035421 A1 | 2/2011 | Laird-McConnell et al. |
| 2011/0081885 A1 | 4/2011 | Sennett et al. |
| 2011/0119716 A1 | 5/2011 | Coleman, Sr. |
| 2011/0138074 A1 | 6/2011 | Onda et al. |
| 2011/0161659 A1 | 6/2011 | Himawan et al. |
| 2011/0165836 A1 | 7/2011 | Dixon et al. |
| 2011/0208338 A1 | 8/2011 | Eteminan et al. |
| 2011/0222404 A1 | 9/2011 | Watson et al. |
| 2011/0230136 A1 | 9/2011 | Washiro |
| 2011/0258249 A1 | 10/2011 | Biggs et al. |
| 2011/0263294 A1 | 10/2011 | Kim et al. |
| 2011/0296399 A1 | 12/2011 | Tugnawat et al. |
| 2011/0306318 A1 | 12/2011 | Rodgers et al. |
| 2011/0314129 A1 | 12/2011 | Rezaiifar et al. |
| 2012/0027059 A1 | 2/2012 | Zhao et al. |
| 2012/0036282 A1 | 2/2012 | Chen et al. |
| 2012/0046022 A1 | 2/2012 | Kalke et al. |
| 2012/0047227 A1 | 2/2012 | Haggerty et al. |
| 2012/0094684 A1 | 4/2012 | Reddy |
| 2012/0106509 A1 | 5/2012 | Klingenbrunn et al. |
| 2012/0129513 A1 | 5/2012 | van der Laak |
| 2012/0129572 A1 | 5/2012 | Johnstone et al. |
| 2012/0135733 A1 | 5/2012 | Cormier et al. |
| 2012/0158580 A1* | 6/2012 | Eram et al. ...................... 705/39 |
| 2012/0203824 A1 | 8/2012 | Oommen |
| 2012/0208511 A1 | 8/2012 | Vanderlinden et al. |
| 2012/0230587 A1 | 9/2012 | Arseneau |
| 2012/0260095 A1 | 10/2012 | Von Hauck et al. |
| 2012/0276872 A1 | 11/2012 | Knauth et al. |
| 2012/0282891 A1 | 11/2012 | Mohammed et al. |
| 2012/0282924 A1 | 11/2012 | Tagg et al. |
| 2013/0023235 A1 | 1/2013 | Fan et al. |
| 2013/0031191 A1 | 1/2013 | Bott |
| 2013/0031234 A1 | 1/2013 | Alfano et al. |
| 2013/0310003 A1 | 1/2013 | Sadhvani et al. |
| 2013/0046951 A1 | 2/2013 | Jones |
| 2013/0065578 A1 | 3/2013 | Raleigh et al. |
| 2013/0072168 A1 | 3/2013 | Colucciello et al. |
| 2013/0085914 A1 | 4/2013 | McPherson et al. |
| 2013/0111461 A1 | 5/2013 | Zubas et al. |
| 2013/0198567 A1 | 8/2013 | Ahmed et al. |
| 2013/0222395 A1 | 8/2013 | Blas, Jr. |
| 2013/0303142 A1 | 11/2013 | Burcham et al. |
| 2013/0311836 A1 | 11/2013 | Hurst et al. |
| 2014/0045483 A1 | 2/2014 | Whidden |
| 2014/0080467 A1 | 3/2014 | Urbanek |
| 2014/0113610 A1 | 4/2014 | Ramprasad et al. |
| 2014/0206313 A1 | 7/2014 | Spanel et al. |
| 2014/0228012 A1 | 8/2014 | Annan et al. |
| 2014/0228042 A1 | 8/2014 | Annan et al. |
| 2014/0274032 A1 | 9/2014 | Shipley et al. |
| 2014/0373184 A1 | 12/2014 | Mahaffey et al. |
| 2015/0111564 A1 | 4/2015 | Urbanek |
| 2015/0111565 A1 | 4/2015 | Urbanek |

FOREIGN PATENT DOCUMENTS

| | | |
|---|---|---|
| WO | WO2014046814 A1 | 3/2014 |
| WO | WO2014113128 A1 | 7/2014 |
| WO | WO2014123758 A1 | 8/2014 |
| WO | WO2014123759 A1 | 8/2014 |
| WO | WO2014158430 A1 | 9/2014 |
| WO | WO2015030945 A1 | 3/2015 |
| WO | WO2015060965 A2 | 4/2015 |

OTHER PUBLICATIONS

Notice of Allowance dated Nov. 2, 2012, U.S. Appl. No. 13/556,202, filed Jul. 24, 2012.

(56) References Cited

OTHER PUBLICATIONS

Notice of Allowance dated Jun. 11, 2013, U.S. Appl. No. 13/752,386, filed Jan. 28, 2013.
First Action Interview Pre-Interview Communication dated Feb. 25, 2013, U.S. Appl. No. 13/149,505, filed May 31, 2013.
First Action Interview Office Action dated May 8, 2013, U.S. Appl. No. 13/149,505, filed May 31, 2013.
Notice of Allowance dated Aug. 9, 2013, U.S. Appl. No. 13/149,505, filed May 31, 2013.
First Action Interview Pre-Interview Communication dated Aug. 13, 2013, U.S. Appl. No. 13/335,941, filed Dec. 23, 2011.
Notice of Allowance dated Oct. 9, 2013, U.S. Appl. No. 13/335,941, filed Dec. 23, 2011.
First Action Interview Pre-Interview Communication dated Apr. 23, 2014, U.S. Appl. No. 13/622,234, filed Sep. 18, 2012.
Final Office Action dated Sep. 19, 2014, U.S. Appl. No. 13/622,234, filed Sep. 18, 2012.
FAIPP Pre-Interview Communication dated Mar. 19, 2014, U.S. Appl. No. 13/744,847, filed Jan. 18, 2013.
Notice of Allowance dated Aug. 4, 2014, U.S. Appl. No. 13/744,847, filed Jan. 18, 2013.
FAIPP Pre-Interview Communication dated Jul. 16, 2014, U.S. Appl. No. 13/744,861, filed Jan. 18, 2013.
First Action Interview Pre-Interview Communication dated Apr. 3, 2014, U.S. Appl. No. 13/763,434, filed Feb. 8, 2013.
Final Office Action dated Aug. 19, 2014, U.S. Appl. No. 13/763,434, filed Feb. 8, 2013.
Office Action dated Aug. 7, 2014, U.S. Appl. No. 13/831,504, filed Mar. 14, 2013.
Foreign Communication from a Related Counterpart—International Search Report and Written Opinion, dated Feb. 29, 2012, PCT/US2011/063736, filed on Dec. 7, 2011.
Foreign Communication from a Related Counterpart Application, "Preliminary Report on Patentability", dated Jun. 20, 2013, PCT/US2011/063736 filed on Dec. 7, 2011.
Foreign Communication from a Related Counterpart—International Search Report and Written Opinion, dated Jul. 24, 2013, PCT/US13/40278, filed on May 9, 2013.
Foreign Communication from a Related Counterpart—International Search Report and Written Opinion, dated Nov. 14, 2013, PCT/US13/55023, filed on Aug. 15, 2013.
Foreign Communication From a Related Counterpart Application, International Search Report and Written Opinion dated Jan. 24, 2014, International Application No. PCT/US13/68981 filed on Nov. 7, 2013.
Foreign Communication from a Related Counterpart—International Search Report and Written Opinion, dated May 19, 2014, PCT/US14/13936, filed on Jan. 30, 2014.
Foreign Communication from a Related Counterpart—International Search Report and Written Opinion, dated May 14, 2014, PCT/US14/13939, filed on Jan. 30, 2014.
Delker, Jason R., "Loading Branded Media Outside System Partition", filed Oct. 30, 2013 U.S. Appl. No. 14/066,947.
Mauer, Brian D., et al., "Automatic Branding of Generic Applications", filed Jan. 10, 2013, U.S. Appl. No. 14/152,627.
Spanel, Robert L., et al., Patent Application entitled "Dynamic Remotely Managed SIM Profile" U.S. Appl. No. 13/744,847, filed Jan. 18, 2013.
Annan, Brandon C., et al.,"System and Method of Branding and Labeling a Mobile Device", filed Mar. 15, 2013, U.S. Appl. No. 13/844,104.
Annan, Brandon C., et al.,"Electronic Fixed Brand Labeling", filed Feb. 8, 2013, U.S. Appl. No. 13/763,443.
Ghoshal, Jagannath, et al.,"Rebranding a Portable Electronic Device While Maintaining User Data", filed May 22, 2013, U.S. Appl. No. 13/899,567.
Ghoshal, Jagannath, et al.,"System and Method for Retrofitting a Branding Framework into a Mobile Communication Device", filed May 21, 2013, U.S. Appl. No. 13/899,566.
Urbanek, Robert E., "Delivery of Branding Content and Customizations to a Mobile Communication Device", filed Oct. 23, 2013, U.S. Appl. No. 14/060,712.
Urbanek, Robert E., "Implementation of Remotely Hosted Branding Content and Customizations", filed Oct. 23, 2013, U.S. Appl. No. 14/085,474.
Urbanek, Robert E., "Subscriber Identity Module Virtualization", filed Nov. 20, 2013, U.S. Appl. No. 14/060,719.
Indurkar, Dhananjay, "System and Method of Branding a Device Independent of Device Activation", filed Jan. 24, 2014, U.S. Appl. No. 14/163,035.
Sumner, Bret D., "Directing Server Connection Based on Location Identifier", filed Aug. 15, 2013, U.S. Appl. No. 13/968,259.
Abou-El-Ella, Hassan, et al., "Segmented Customization Payload Delivery", filed Aug. 27, 2013, U.S. Appl. No. 14/010,518.
Sumner, Bret D., "Segmented Customization Package Within Distributed Server Architecture", filed Aug. 27, 2013, U.S. Appl. No. 14/010,522.
Masterson, Michelle E., et al., "Development and Testing of Payload Receipt by a Portable Electronic Device", filed Aug. 27, 2013, U.S. Appl. No. 14/010,523.
Masterson, Michelle E., et al., "System and Methods for Deferred and Remote Device Branding", filed Jul. 16, 2014, International Serial No. PCT/US14/46773.
Callan, Jeffery S., et al., "Delivery of Oversized Branding Elements for Customization", filed Nov. 6, 2013, U.S. Appl. No. 14/073,321.
Indurkar, Dhananjay, "Background Delivery of Device Configuration and Branding", filed Jan. 16, 2014, U.S. Appl. No. 14/157,507.
Ahn, Chul Jin, et al., "Separation of Client Identification Composition from Customization Payload to Original Equipment Manufacturer Layer", filed Nov. 8, 2013, U.S. Appl. No. 14/075,687.
Ghoshal, Jagannath, et al., "Multiple Carrier Partition Dynamic Access on a Mobile Device", filed Jun. 5, 2014, U.S. Appl. No. 14/297,429.
Indurkar, Dhananjay, "Activation Sequence Using Permission Based Connection to Network", filed Jan. 24, 2014, U.S. Appl. No. 14/163,041.
Ahn, Chul Jin, et al., "Customization for Preloaded Applications", filed Mar. 31, 2014, U.S. Appl. No. 14/231,718.
First Action Interview Pre-Interview Communication dated Sep. 22, 2014, U.S. Appl. No. 13/468,028, filed May 9, 2013.
Foreign Communication from a Related Counterpart—International Search Report and Written Opinion, dated Jun. 3, 2014,PCT/US14/16650, filed on Feb. 16, 2014.
Urbanek, Robert E., "Delivery of Branding Content and Customizations to a Mobile Communication Device", filed , 201, International Serial No. PCT/US14/56778.
Advisory Action dated Dec. 17, 2014, Application U.S. Appl. No. 13/622,234, filed on Sep. 18, 2012.
Notice of Allowance dated Nov. 22, 2014, Application U.S. Appl. No. 13/744,861 filed on Jan. 18, 2013.
First Action Interview Pre-Interview Communication dated Oct. 22, 2014, U.S. Appl. No. 13/763,428, filed Feb. 8, 2013.
Notice of Allowance dated Dec. 29, 2014, U.S. Appl. No. 13/831,504, filed Mar. 14, 2013.
First Action Interview Pre-Interview Communication dated Nov. 20, 2014, filed on May 21, 2013.
Foreign Communication from a Related Counterpart Application, "Preliminary Report on Patentability," dated Nov. 20, 2014, PCT/US13/40278 filed on May 9, 2013.
Foreign Communication from a Related Counterpart—International Search Report and Written Opinion, dated Dec. 17, 2014, PCT/US14/46773, filed on Jul. 16, 2014.
Foreign Communication from a Related Counterpart—International Search Report and Written Opinion, dated Dec. 30, 2014, PCT/US14/56778, filed Sep. 22, 2014.
Spanel, Robert L., et al., Patent Application entitled "Dynamic Remotely Managed SIM Profile" U.S. Appl. No. 14/522,586, filed Oct. 24, 2014.
Urbanek, Robert E., "Delivery of Branding Content and Customizations to a Mobile Communication Device", filed Sep. 22, 2014, International Serial No. PCT/US14/56778.

(56) References Cited

OTHER PUBLICATIONS

Koller, Gary D., et al., "Out of the Box Experience (OOBE) Country Choice Using Wi-Fi Layer Transmission," filed Oct. 31, 2014, U.S. Appl. No. 14/530,666.
Blinn, Benjamin P., et al. "System and Method of Efficient Mobile Device Network Brand Customization," filed Sep. 2, 2014, U.S. Appl. No. 14/475,399.
First Action Interview Office Action dated Mar. 16, 2015, U.S. Appl. No. 13/468,028, filed May 9, 2013.
Office Action dated Mar. 2, 2015, U.S. Appl. No. 13/622,234, filed Sep. 18, 2012.
FAIPP Pre-Interview Communication dated Mar. 26, 2015, U.S. Appl. No. 14/522,586, filed Oct. 24, 2014.
FAIPP Pre-Interview Communication dated Apr. 8, 2015, U.S. Appl. No. 13/844,104, filed Mar. 15, 2013.
Notice of Allowance dated Mar. 20, 2015, U.S. Appl. No. 13/763,428, filed Feb. 8, 2013.
Notice of Allowance dated Mar. 26, 2015, U.S. Appl. No. 13/763,434, filed Feb. 8, 2013.
FAIPP Pre-Interview Communication dated Mar. 12, 2015, U.S. Appl. No. 13/972,827, filed Aug. 21, 2013.
Notice of Allowance dated Jan. 22, 2015, U.S. Appl. No. 13/899,566, filed May 21, 2013.
FAIPP Pre-Interview Communication dated Apr. 15, 2015, U.S. Appl. No. 14/060,712, filed Nov. 20, 2013.
FAIPP Pre-Interview Communication dated Mar. 4, 2015, U.S. Appl. No. 14/010,518, filed Aug. 27, 2013.
FAIPP Pre-Interview Communication dated Apr. 1, 2015, U.S. Appl. No. 14/010,522, filed Aug. 27, 2013.
FAIPP Pre-Interview Communication dated Apr. 3, 2015, U.S. Appl. No. 14/010,523, filed Aug. 27, 2013.
FAIPP Pre-Interview Communication dated Apr. 8, 2015, U.S. Appl. No. 14/157,507, filed Jan. 16, 2014.
Foreign Communication from a Related Counterpart—International Preliminary Report on Patentability, dated Apr. 2, 2015, PCT/US13/55023, filed on Aug. 15, 2013.
Ghoshal, Jagannath, et al., "Multi-Step Mobile Device Initiation with Intermediate Partial Reset," filed Aug. 21, 2013, U.S. Appl. No. 13/972,827.
Delker, Jason R., et al. "Subscriber Identity Module (SIM) Card Initiation of Custom Application Launcher Installation on a Mobile Communication Device," filed Mar. 4, 2015, U.S. Appl. No. 14/639,056.
Delker, Jason R., et al. "Network Access Tiered Based on Application Launcher Installation," filed Mar. 4, 2015, U.S. Appl. No. 14/639,060.
FAIPP Pre-Interview Communication dated Jun. 2, 2015, U.S. Appl. No. 14/152,627, filed Jan. 10, 2013.
Notice of Allowance dated Jul. 7, 2015, U.S. Appl. No. 14/522,586, filed on Oct. 24, 2014.
FAIPP Pre-Interview Communication dated Apr. 23, 2014, U.S. Appl. No. 13/763,443, filed Feb. 8, 2013.
First Action Interview Office Action dated Jun. 16, 2014, U.S. Appl. No. 13/763,443, filed Feb. 8, 2013.
Office Action dated Jun. 16, 2015, U.S. Appl. No. 13/899,567, filed May 22, 2013.
Notice of Allowance dated May 7, 2015, U.S. Appl. No. 13/972,827, filed Aug. 21, 2013.
Notice of Allowance dated May 29, 2015, U.S. Appl. No. 14/085,474, filed Nov. 20, 2013.
Notice of Allowance dated May 8, 2015, U.S. Appl. No. 14/010,518, filed Aug. 27, 2013.
Notice of Allowance dated Jul. 8, 2015, U.S. Appl. No. 14/010,522, filed Aug. 27, 2013.
Notice of Allowance dated Jun. 26, 2015, U.S. Appl. No. 14/010,523, filed Aug. 27, 2013.
Restriction Requirement dated May 21, 2015, U.S. Appl. No. 14/073,321, filed Nov. 6, 2013.
FAIPP Pre-Interview Communication dated Jul. 8, 2015, U.S. Appl. No. 14/475,399, filed Sep. 2, 2014.
Amazon Kindle e-book reader, on public sale 2007, http://en.wikipedia.org/wiki/Amazon_Kindle. last accessed on Apr. 13, 2015.

\* cited by examiner

SYSTEM AND METHODS FOR DEFERRED AND REMOTE DEVICE BRANDING

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Portable electronic devices may be manufactured for use on multiple telecommunications service providers' networks and/or for use with multiple brands within a provider's network. These devices may be assigned to a particular network or network brand and have hardware, software, firmware. Portable electronic devices may be packaged to reflect the manufacturer, device model, device brand name, and the network brand and to include in-package instructions related to activation, use, and maintenance of the device.

SUMMARY

In an embodiment, a portable electronic device capable of operating on a telecommunications service provider's network under a plurality of brands, comprising: a processor, a memory comprising a system memory partition, a user memory partition, and a carrier memory partition; an initial identification, wherein the initial identification is assigned by an original equipment manufacturer (OEM) based on at least one of a device type, a device manufacturer, and a device model; and a brand identification, wherein the brand identification is assigned to the portable electronic device in addition to or instead of the initial identification at the original equipment manufacturer, a distribution center, or at a point-of-sale location. The embodiment further comprising: an application stored in the memory that, when executed by the processor, accesses a plurality of brand payloads stored on a server comprising at least one data store, wherein a limited communication mode is established between the portable electronic device and a network, wherein the limited communication mode allows the device to connect to emergency services and receive payloads from the network, and wherein at least some of the plurality of brand payloads is received by the portable electronic device in response to powering-on and based on the brand identification.

In an embodiment, A method of sending brand payloads to a portable electronic device comprising: establishing, by a network server on a telecommunications service provider network, a wireless connection to a portable electronic device, wherein the wireless connection is established in a limited communication mode, wherein the limited communication mode allows the portable electronic device to contact emergency services and receive a plurality of payloads from the network server, and wherein the limited communication mode restricts all other communication between the portable electronic device and the server, and determining, by a brand server on the telecommunications service provider network, a type of brand SKU associated with the portable electronic device. The embodiment further comprising: sending, by the brand server, in response to the determination, a payload comprising a plurality of brand payloads to the portable electronic device over the wireless connection, wherein the brand payload comprises terms and conditions, startup information, and a user guide; and granting, by the network server, to the portable electronic device, in response to a determination that the payload was sent and executed, access to at least one of voice services and data services.

In an embodiment, a method of sending brand payloads to a portable electronic device comprising: establishing, by a server, a wireless connection to a portable electronic device, wherein the wireless connection is established in a limited communication mode, wherein the limited communication mode allows the device to connect to emergency services and receive a payload from the network; and determining, by a server, if a memory of the portable electronic device comprises a brand SKU, wherein the brand SKU is associated with a brand of a telecommunications service provider. The embodiment further comprising: determining, in response to the determination that the memory comprises the brand SKU, a brand associated with the brand SKU; sending, by the server, in response to the determination of the brand associated with the brand SKU, a brand payload to the portable electronic device over a wireless network; and sending, by the server, in response to the determination that the memory does not comprise the brand SKU, a notification to the portable electronic device.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Conventionally, a portable electronic device may be intended for use with a brand of a plurality of brands supported by a telecommunications service provider. The device may comprise hardware, software, and firmware that collaborate to provide an experience associated with that brand that may be installed at the OEM and/or the provider. This brand-specific package of hardware, software, and firmware, may provide parts of the user experience such as the logo at power-on/power-off and a contact for customer care. The brand may also affect what applications and services supported by the telecommunications service provider can be accessed from the device and what options are presented and/or available to the device in an online store where applications and utilities can be purchased and/or downloaded.

Conventionally, in addition to hardware and software components, firmware, and configurable options, each brand may have its own packaging including soft pack, hard pack, boxes, shrink wrap, and package inserts such as user guide, terms and conditions of use, as well as instructions for use and other materials related to startup and maintenance of the device. Therefore, if there is an unexpected demand under a particular brand for a specific device, there may not be inventory available to fill this demand. This may be, for example, because forecasting or other supply chain information may have indicated that a product lot should be divided between brands as follows: 40% brand X, 30% brand Y, and 30% brand Z. However, if this information was incorrect or if economic factors, supply chain factors, or consumer interest changes, for example due to a promotion under brand Z, the actual demand is 25% brand X, 22% brand Y, and 53% brand Z, there would be a 23% gap between available inventory from that lot and product demand. If that 23%, in whole or in part, can be rebranded at its current inventory location, or if the branding could have been deferred closer to or at the point of sale, this may save the cost of shipping, packaging, and labor that was conventionally assumed when a brand change was needed for inventory redistribution. While conversion procedures may have been available conventionally to convert inventory from one brand to another, these procedures may have been costly and time-consuming and involved bringing a device in for service to a retail location, or shipping a device to a remote location for service. Therefore, conventionally, packaged devices may have had to have the packaging opened, have inserts replaced, have internal and/or external packaging replaced, and then be re-packaged to reflect the new brand.

As such, telecommunications service providers may desire a system and a method that enables the provider to assign branding information downstream in the supply chain and to reassign and/or change brands if inventory is reallocated or if a device is refurbished. By assigning a brand further downstream than in the initial packaging process or manufacturing process of the device, the brand can more easily be changed if needed. The present disclosure relates to packaging and provisioning of portable electronic devices so that the device is assigned to a brand in the packaging process in order to decrease the instances and cost associated with repackaging. This may be referred to as deferred assignment of branding, which means that the branding may be assigned later in the distribution cycle, for example when more information or more reliable information on brand identity of the devices is available (e.g., when committed orders are in hand). In some embodiments, rebranding may be accomplished without changing any physical components of the packaging. This brand assignment may take place prior to the device leaving the manufacturer (OEM) and a single stock keeping unit (SKU), which may be referred to as an OEM SKU, may be assigned to a plurality of devices.

An OEM is an original equipment manufacturer, a manufacturer of products such as portable electronic devices that takes components manufactured in-house or purchased from a sister company or third party and assembles/manufactures a product. This product may be a finished product for sale as-is, or may undergo further processing, for example having software and/or firmware installed, having configuration settings installed, and other processing. This further processing may be performed by an entity other than the original equipment manufacturer, for example by a customer of the original equipment manufacturer, for example by an order fulfillment center of a wireless communication service provider that receives a mobile communication device from the original equipment manufacturer and then installs additional software, firmware, and/or configuration settings into the mobile communication device. A stock keeping unit is an identifier used to track and/or identify a plurality of products and/or product families through the supply chain. In some circumstances, devices identified by a stock keeping unit may be tested in accordance with company and/or government-mandated testing procedures. It is appreciated that brand assignment may be performed on a new, unused device, or on a device that may or may not have been in use and has already had a brand assigned and is having a new brand assigned, for example, during refurbishment or inventory reallocation.

In an embodiment, these devices are all packaged in a manner that reflects the telecommunications service provider, for example, the box that contains the device and any related accessories. The outside box may comprise a generic telecommunications service provider's logo and other information that is not specific to any brand. The packaging may also comprise, on the outside of the box or otherwise, information related to the OEM such as the make, model, and device brand name of the device. It is appreciated that a device brand and a telecommunications brand are not the same. The device brand is the name used to recognize the actual portable electronic device and the telecommunications service provider brand is the brand under which data and/or voice services are provided to the device.

In one embodiment, in order to reflect the brand of each device, a brand-specific sleeve may be placed over the package downstream in the supply chain process, for example, at the OEM, at a distribution center, or at the point-of-sale. In addition to the physical indication of branding, the device may receive a brand SKU in addition to or instead of the SKU assigned by the OEM (the OEM SKU) for testing and traceability. Receipt and/or assignment of the brand SKU assigns a SKU identity related to a brand to a parameter in the memory of the portable electronic device which may be stored in the same location as the OEM SKU or in a different location depending upon the embodiment. This assignment of the brand SKU may be done at the OEM, distribution center, or point-of-sale. It is appreciated that the provisioning is the process by which a device or devices are prepared for and equipped to allow service to new and refurbished devices. The brand SKU may be used for provisioning so that the appropriate payload for the brand assigned to the device is sent to the device.

In an embodiment, a portable electronic device with an assigned brand SKU that has either never had a brand assigned or is having a new brand assigned, for example during refurbishment or inventory re-allocation, is powered on in a capacity limited by the network which may also be referred to as a "walled garden." The term "walled garden" as used herein refers to a device that has a limited set of functionality in a non-billable state used for initial registration and refurbishment. In this limited capacity, the device may, for example, access emergency service (911) and engage in activation directed communications with specific provisioning/activation servers in the wireless network. While in the walled garden, the device may not be able to make voice calls, check email, engage in social networking activities, or otherwise transmit data for non-activation or provisioning purposes. In this limited functionality mode, terms and conditions sent to the device may be reviewed and accepted, a startup guide or instructions may be reviewed, active steps dictated by the startup instructions may be executed, and a user guide may be reviewed.

A sub-SKU, which may also be referred to as a brand SKU, is assigned to each device either at the OEM, at a distribution center, or at the point-of-sale during the activation/provisioning process. The term sub-SKU is used herein to mean simply that it is a SKU that is associated with a brand, not to be confused with the OEM SKU used for tracking manufacturing and testing of assembled devices. The brand SKU, as discussed in detail below, may or may not be associated with the OEM SKU depending upon the embodiment. While in the walled garden, the device receives provisioning information, which may comprise a payload and/or a brand payload, based on its brand SKU.

While the OEM SKU, assigned by the OEM to a plurality of devices during the manufacturing and/or refurbishment process, may reflect the type, model, or brand of the device itself, and may be used for testing and/or supply chain control including manufacturing through packaging, the brand SKU is associated with the brand of service provider that supports the device. It is appreciated that the term "supply chain" as used herein is used to describe the process of manufacturing a device or a plurality of devices that may include the initial orders for device components, orders for manufacture, testing, packaging, and other parts of the manufacturing process that involve inventory and raw material control. It is appreciated that at least some of the processes described herein to initially assign brands to devices as applied to new devices could also be applied to the refurbishment of devices and the reallocation of previously branded devices.

In an embodiment, when the portable electronic device is activated for the first time or as a part of the refurbishment process, the provisioning information, including the brand payload, is sent to the device by the network based upon the brand SKU. In an embodiment, a server accessible by the device in the walled garden may first check to see if a brand SKU is associated with the device. If there is a brand SKU associated with the device, the brand payload may be sent by the server to the device. If a brand SKU is not found to be associated with the device, the server may try again and/or may send a notification to another server or to a supervisor with access to the server as to the missing brand SKU. This brand payload may comprise information for the startup of the device such as terms and conditions of use, a user guide, and startup instructions.

In an embodiment, the terms and conditions as well as at least some portions of the user guide and/or startup instructions may be clicked through by the user as an indication of acceptance of terms. It is appreciated that the terms and conditions, user guide, and startup instructions may be separate documents or that they may be combined in whole or in part in various combinations. Once this brand payload is received by the device, the device may be authorized to receive voice and/or data services and may then operate outside of the walled garden. In some embodiments, the device is associated with a service plan for the brand and may begin receiving voice and/or data services from the network after the device is provisioned. In that embodiment, the terms and conditions may reflect the service plan, or a separate set of information for the service plan may be sent to the device as a part of the brand payload or as part of a separate payload.

By assigning a brand SKU to a device, the appropriate brand payload may be sent from the network to that device so that it can be provisioned and function properly under the brand. In addition, by using this method as opposed to assigning the brand upstream in the supply chain/manufacturing process, the packaging scrap created by changing brands may be reduced or eliminated. For example, three pallets of portable electronic devices are intended for use with Brand X, and the software, hardware, firmware, and physical packaging associated with Brand X are loaded on to or packaged with the device at the OEM. If two of these pallets are then requested by production planning or customer care for use with Brand Y, each device must be broken down out of hard pack, soft pack, shrink wrap, and any paper instructions such as the terms and conditions contained within the boxes may be scrapped. Not only do un-packaging and re-packaging waste time, but the time spent on initially packaging the devices may also be a loss.

By using a brand SKU that can be assigned electronically without the physical device being returned to a retail location or remote servicing location, this means that the brand SKU can also be re-assigned if product is desired on a particular brand when existing inventory may not support additional demand. In addition, if there was an issue in the supply chain where inventory was not generally readily available, the systems and methods disclosed herein could re-assign branding for a plurality of devices without the time and expense of repackaging and thereby more readily satisfy market demand. In some embodiments, the brand SKU may replace the original SKU, with traceability maintained at the OEM and/or the provider. In other embodiments, the brand SKU is assigned in addition to or as a subset of the OEM's SKU.

Figure 1:
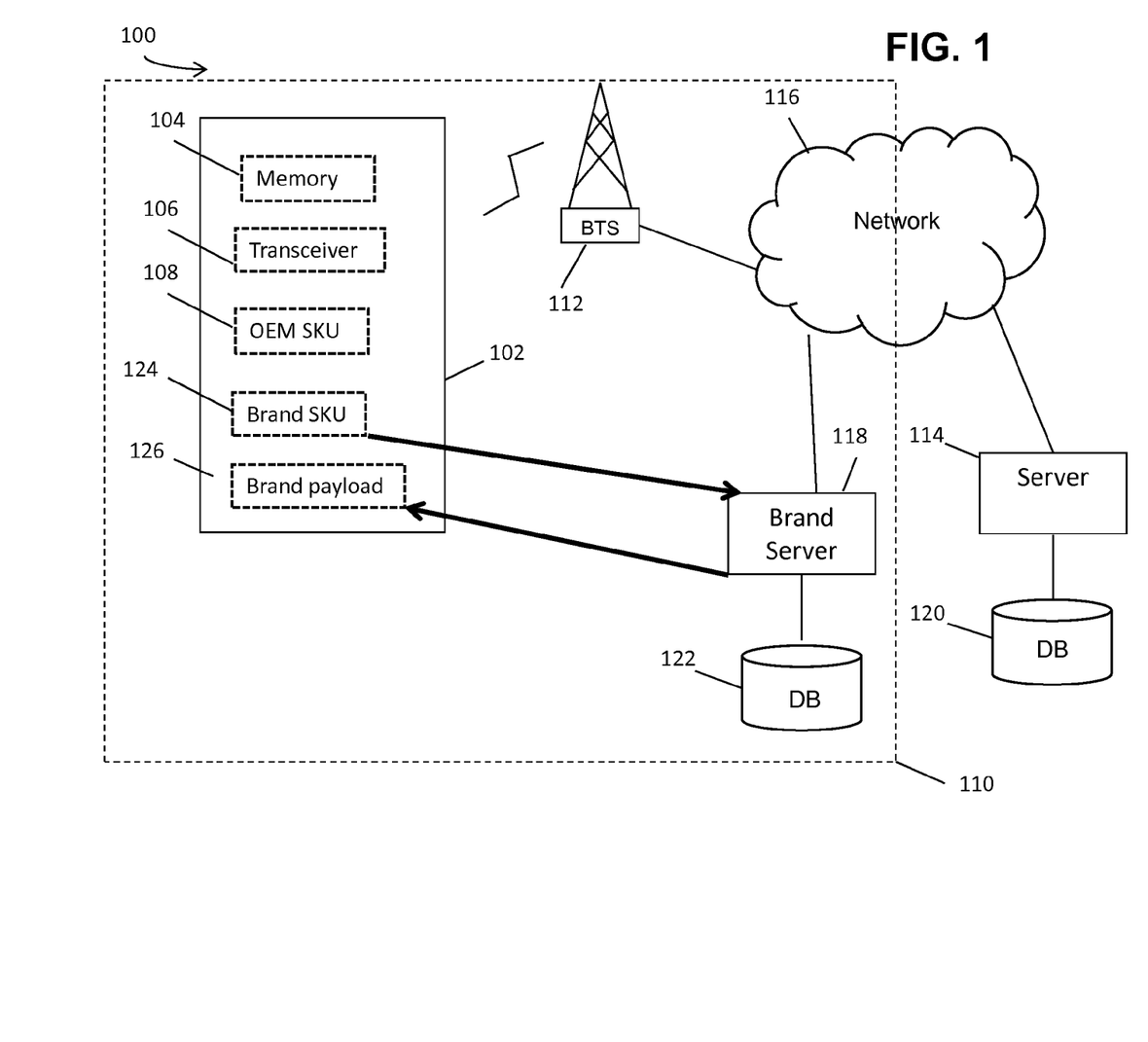
FIG. 1 illustrates a system according to an embodiment of the disclosure.

FIG. 1 illustrates a system according to an embodiment of the disclosure. In system 100, portable electronic device 102 comprises a memory 104, a wireless transceiver 106, and an OEM SKU 108. The memory 104 may comprise a plurality of partitions including a system memory partition associated with the OEM, a user memory partition comprising user data, and a carrier memory partition associated with the telecommunications service provider. The mobile communication device may have memory established as a system memory partition and a user memory partition. An operating system of the mobile communication device may restrict write access to the system memory partition and may prevent the contents of the system memory partition being erased during reset operations, for example resetting to factory defaults. For example, a user may be prevented from writing to the system memory partition and/or from causing writing to the system memory partition.

By contrast, the operating system of the mobile communication device may allow unrestricted write access to the user memory partition. For example, a user of the mobile communication device may be permitted by the operating system to write information into the user memory partition, at least indirectly by exercising user interface control selections, for example entering personal contacts, installing third party applications, downloading ring tones, and the like. During a reset, for example during a reset to factory defaults, the information in the user memory partition may be deleted by the operating system. The ANDROID operating system used by some mobile communication devices may establish a system memory partition and a user memory partition.

The operating system may further provide write access to a carrier memory partition to privileged users or automated processes. For example, an individual providing a carrier memory partition key or password, for example an employee or contractor associated with a wireless communication service provider, may be allowed by the operating system to write to the carrier memory partition. Alternatively, instructions that execute on the mobile communication device may be granted the privilege to write to the carrier partition by the operating system based on the instructions providing the key or password.

In an embodiment, the key or password is unavailable and unknown to a user of the mobile communication device, for example the key or password may only be known to the wireless service provider and/or carrier. In an embodiment, the instructions may invoke an application programming interface (API) provided by the operating system to write to the carrier memory partition, and the API call may entail providing the key or password associated with the carrier memory partition. In some contexts, this may be referred to as a carrier memory partition key or a carrier memory partition password. An automated procedure or function executed on the mobile communication device that presents a carrier memory partition key or password, for example a script wirelessly transmitted to the mobile communication device, may be permitted to write to the carrier memory partition. The carrier memory partition may be used to store branding information. The carrier memory partition further may be used to store other information unrelated to branding and/or customization content. For further details about carrier memory partitions, see U.S. patent application Ser. No. 13/763,428, filed Feb. 8, 2013, entitled "System and Method of Storing Service Brand Packages On a Mobile Device," by Brandon C. Annan, et al., which is hereby incorporated by reference in its entirety.

This OEM SKU 108 may be assigned by the portable electronic device 102 manufacturer (OEM) and may be shared by a plurality of similar devices. The OEM SKU 108 may be used by the OEM and the telecommunications service provider for component and testing traceability as well as to track the portable electronic device 102 in the supply chain. Traceability may be dictated by agency regulation and/or internal OEM policy or customer policy, where the customer is the telecommunications service provider, for the purposes of quality and inventory control.

The portable electronic device 102 may be in wireless communication with a network 116 through a base transceiver station 112. A brand identifier 124, which may also be referred to as a brand SKU 124, which may be assigned by the OEM prior to shipping to a distribution center, or at the distribution center, or at the point-of sale prior to sale, may be used to load a brand payload 126 on to the portable electronic device 102. It is appreciated that the brand SKU 124 may replace or be associated with the portable electronic device 102 in addition to the OEM SKU 108, and that the brand SKU 124 and may or may not be related to the OEM SKU 108. For example, an OEM SKU 108 could be related to the brand SKU 124 if the OEM SKU 108 was "832104" and the brand-SKU 124 could be "832104X," where X represents an alpha, alphanumeric, color, numeric, or other indication of the associated brand. In another example, the OEM SKU 108 could be 982250 and the brand SKU 124 could be an unrelated alpha, alphanumeric, color, numeric, or other indication of the associated brand. In that example, there may be the data store 122 may comprise information that relates the OEM SKU 108 to the brand SKU 124 for traceability purposes.

Brand information such as the user guide, startup information, and terms and conditions may be stored by a telecommunications service provider on a brand server 118 that comprises at least one data store 122. The brand server 118, in response to the portable electronic device 102 being powered on and sending an activation initiation message which may also be referred to as a branding initiation message, recognizes the brand SKU 124 and sends a brand payload 126 to the portable electronic device 102, part of which may be used to provision the portable electronic device 102. Provisioning is the term used to describe the process used to configure the base transceiver station 112 and the network 116 to grant a device access to data stores, systems, network applications, and authorize the hardware, software, and firmware on the device to have the appropriate rights and privileges to operate on at least one network. Part of the provisioning process may comprise a user's electronic acceptance of the terms and conditions as well as a series of startup steps. This brand information may also include a user guide. The user guide may comprise information about the portable electronic device 102 as well as the services offered by the brand for that portable electronic device 102. At least some of the brand payload 126 is sent to the portable electronic device 102 so that the user can access it from the portable electronic device 102 instead of having a paper copy in the packaging. This reduces the packaging costs as well as the cost of rebranding, if desired. The startup instructions may comprise a plurality of instructions to follow that can be viewed on the graphical user interface of the portable electronic device 102.

The information sent in the brand payload 126 in response to recognition of the brand SKU 124 and determination of the brand associated with the brand SKU 124 may be information that was formerly located on the outside of a package (printed or add-on) of a packaged device or inside the package as a paper handout or printed instructions. Instead, the brand payload 126 is sent to the portable electronic device 102 as part of the provisioning/activation process. The provisioning process may comprise the user clicking through the terms and conditions of a graphical user interface of the portable electronic device 102 as well as the startup guide. A walled garden 110 is represented in FIG. 1 to illustrate the limited functionality that portable electronic device 102 may experience prior to and during the provisioning process, part of which comprises sending the brand payload 126 to the portable electronic device 102 based on the brand SKU 124. It is appreciated that the walled garden 110, while shown in FIG. 1 to encompass the portable electronic device 102, BTS 112, brand server 118 and data store 122, server 114 and data store 120, as well as part of network 116, may encompass alternate and/or additional components depending upon the embodiment.

Figure 2:
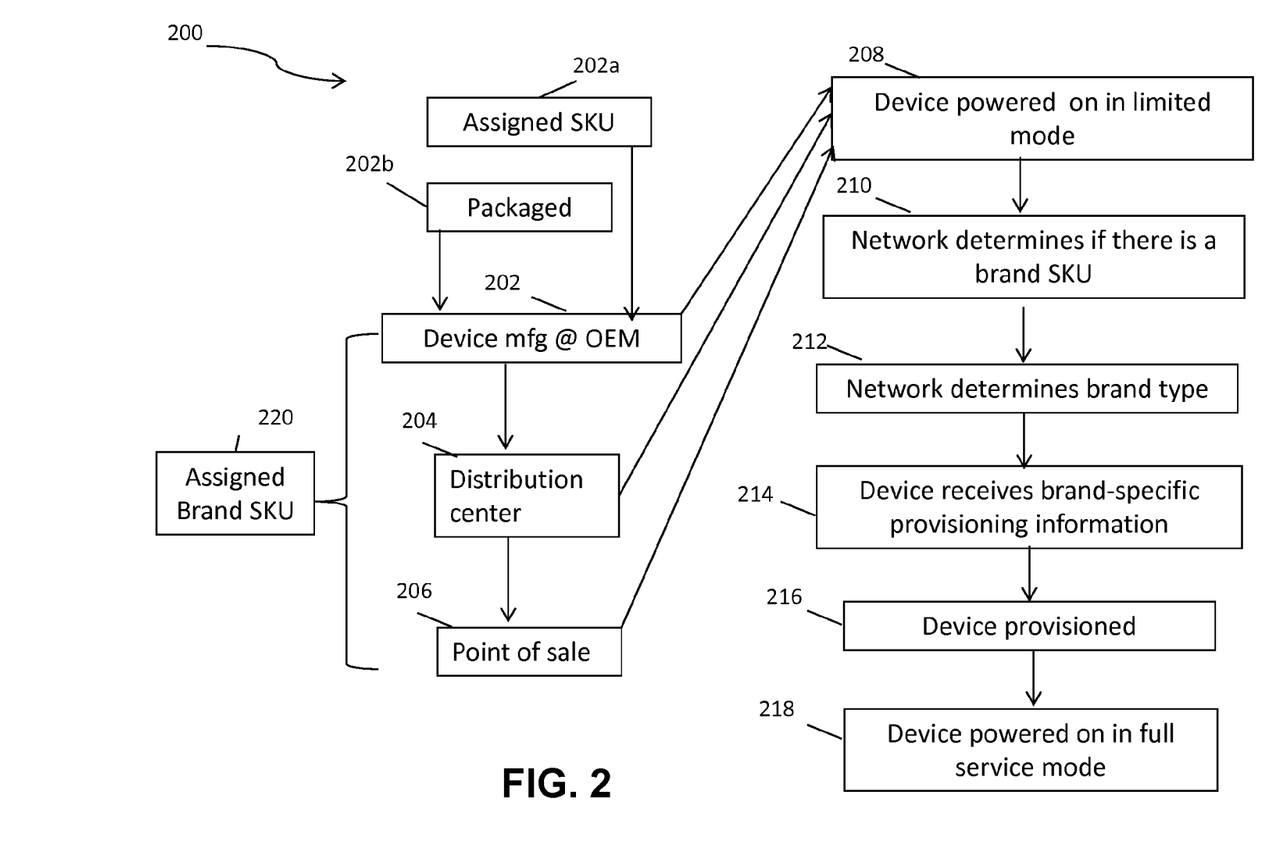
FIG. 2 is a flow chart illustrating a method of sending brand payloads to a portable electronic device according to embodiments of the present disclosure.

FIG. 2 is a flow chart illustrating a method of sending brand payloads to a portable electronic device according to embodiments of the present disclosure. In method 200, and referring back to FIG. 1, the portable electronic device 102 is manufactured at an OEM at block 202 and assigned an initial identification which may be referred to as an OEM SKU 108 at 202a and packaged at 202b. In an embodiment, blocks 202a and 202b may occur simultaneously or in any order. The OEM SKU 108 is an identifier that may be alpha, alphanumeric, numeric, or another identifier used to track the manufacture and testing of a portable electronic device 102 as shown in FIG. 1 or a plurality of devices. The portable electronic device 102 may be packaged at block 202b in a hard pack, soft pack, box, shrink wrap, and may comprise labeling or scan-able information on the outside of the package. The portable electronic device 102 may then be sent to a middle point before sale at block 204 which may be a distribution center for the OEM or for a telecommunications service provider that provides voice and/or data services for the portable electronic device 102. At block 206, the portable electronic device 102 may be sent to the point of sale or to another intermediate point. At any of blocks 202, 204, 206, or in some embodiments subsequent to packaging at block 202b, a brand SKU 124 is assigned to the portable electronic device 102 at block 220.

As discussed above, this brand SKU 124 is used to provision the portable electronic device 102 in part to reduce the labor and materials of the packaging process and in part to maximize the ability of the supply chain operation to allocate and reallocate inventory between different brands. At block 208, the portable electronic device 102 is powered on at a point after the brand SKU 124 is assigned to the portable electronic device 102. The portable electronic device 102 is powered on at block 208 in a limited communication mode. This limited communication mode, as discussed above, may allow the device to contact emergency services and receive limited communication from a telecommunications service provider associated with the brand type of the brand SKU 124. This limited communication may comprise provisioning and other setup information used to authorize the portable electronic device's 102 operation and receipt of voice and/or data services under a particular brand. In some embodiments, receipts of these services may be based upon a subscription plan. When the device is powered on, the network 116 determines whether there is a brand SKU 124 at block 210 and, if so, determines the brand type at block 212. If there is no brand SKU 124 associated with the portable electronic device 102, another attempt may be made and/or a notification may be sent to quality control, a supervisor, or another server or queue on a server that will be reviewed to determine if the lack of brand SKU 124 is a one-time event or whether a pallet or larger group of devices are missing a brand SKU 124.

If the brand is determined, the portable electronic device 102 receives a brand payload 126 comprising a plurality of brand-specific provisioning information at block 214. As discussed above, this information may comprise terms and conditions of use, a user guide or manual, and startup instructions. At block 216 the portable electronic device 102 is provisioned and at block 218 the device, subsequent to provisioning, is powered on in a full service mode. The full service mode may allow the portable electronic device 102 access to systems and operations related to voice and/or data services, which the portable electronic device 102 may be authorized to access based on a subscription plan. The provisioning process at block 216 may comprise acceptance of terms and conditions, completion of a plurality of steps in the startup instructions, as well as the determination of whether there is a subscription plan associated with the portable electronic device 102. By using a brand SKU 124 to determine the portable electronic device 102 brand and send a brand payload 126 of a plurality of brand payloads stored on the at least one data store 122 of the brand server 118, the portable electronic device 102 packaging process can be reduced to only the packaging components used for protecting the device's integrity during shipping and distribution. It is appreciated that sending of the brand payload 126 at block 214 may be done for a new device or may be done for a device that is being refurbished. Using the systems and method disclosed herein, the packaging process may be streamlined, inventory may be more easily assigned and reassigned/reallocated to brands. This may save packaging costs, labor costs, and increase customer retention and good will because customers may not have to wait for inventory for a particular brand like they would if the devices had to be physically repackaged.

Figure 3:
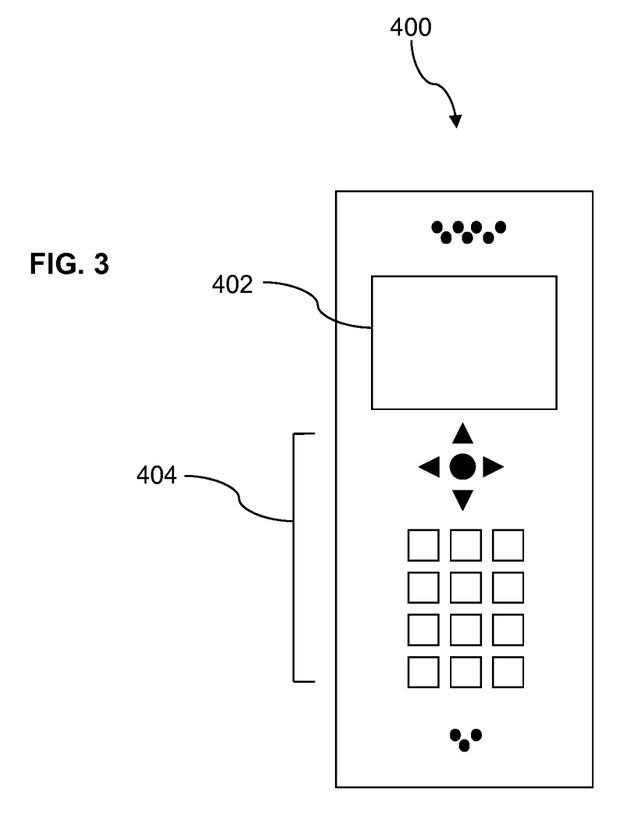
FIG. 3 depicts a mobile device operable for implementing aspects of the present disclosure.

FIG. 3 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 4:
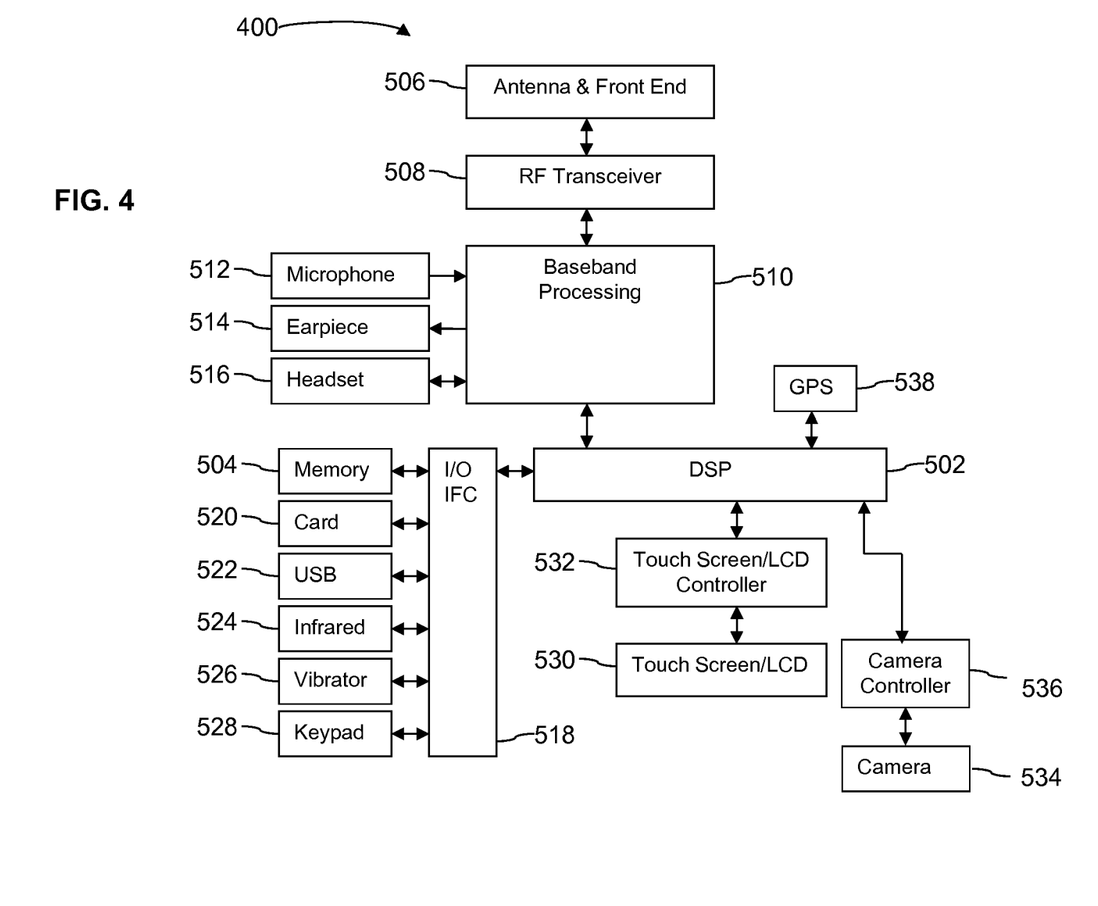
FIG. 4 depicts a block diagram of a mobile device according to embodiments of the present disclosure.

FIG. 4 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As discussed with respect to FIG. 1, the memory 504 may comprise a plurality of memory partitions including a carrier memory partition, user memory partition, and system memory partition. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. In alternate embodiments, the communication may provide a limited communication mode as discussed in FIG. 1 with respect to the walled garden 110. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth interface or an IEEE 802.11 compliant wireless interface may enable the mobile device 400 to communicate wirelessly with other nearby handsets and/or wireless base stations.

The keypad 528 couples to the DSP 502 via the interface 518 to provide one mechanism for the user to make selections, enter information, and otherwise provide input to the mobile device 400. This function may be accessible even in a limited communication mode in order to allow the user to accept terms and conditions and perform other functions as indicated in the startup guide. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figures 5A, 5B:
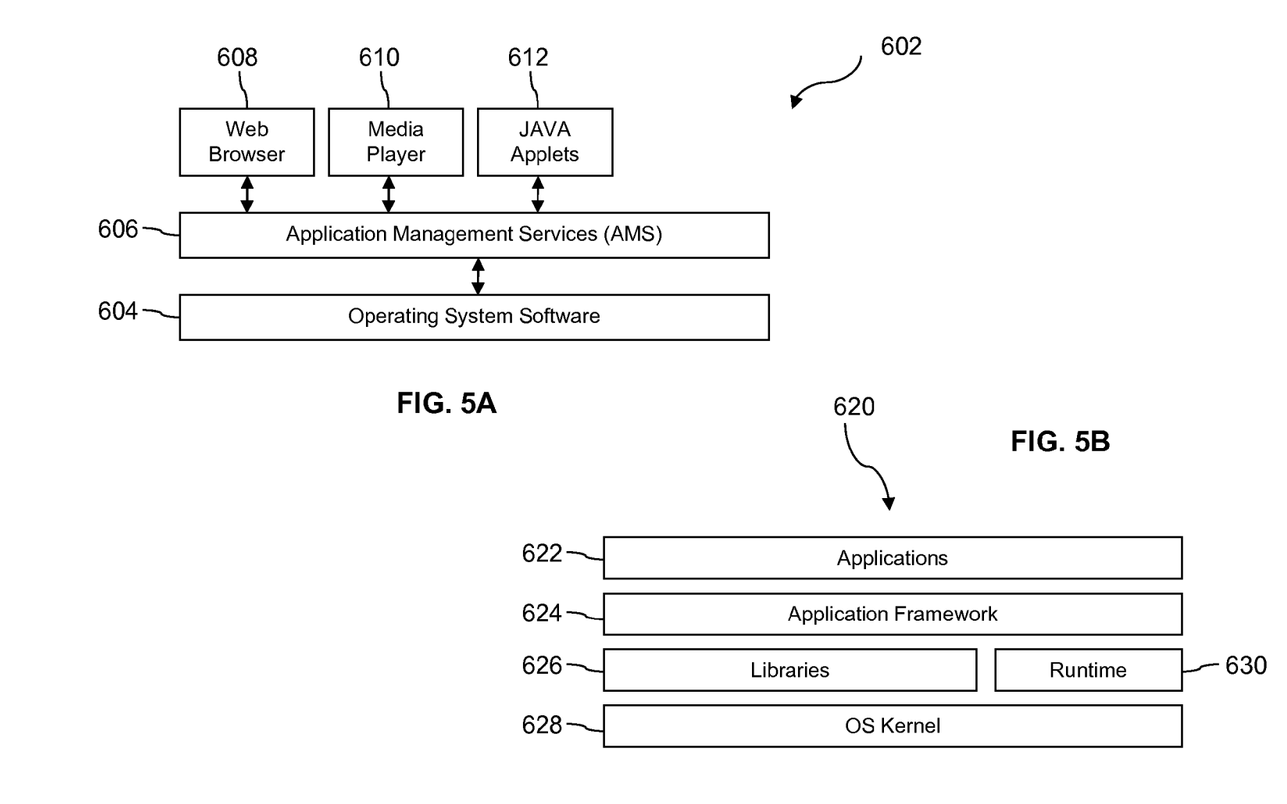
FIG. 5A illustrates a software environment that may be operable for implementing aspects of the present disclosure.
FIG. 5B illustrates an alternative software environment that may be operable for implementing aspects of the present disclosure.

FIG. 5A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 5A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

FIG. 5B illustrates an alternative software environment 620 that may be implemented by the DSP 502. The DSP 502 executes operating system software 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 6:
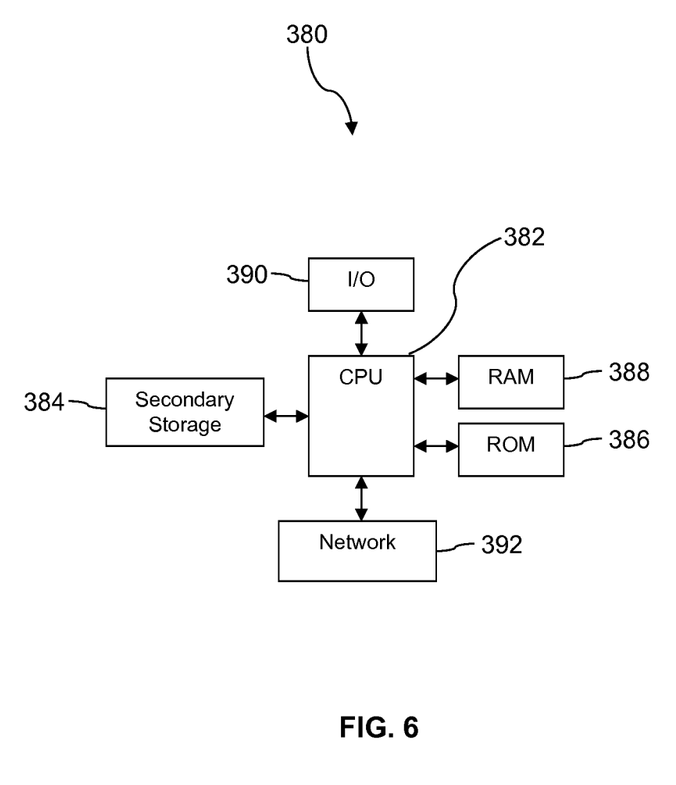
FIG. 6 illustrates a computer system that may be operable for implementing aspects of the present disclosure.

FIG. 6 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/ or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts, which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A portable electronic device capable of operating on a telecommunications service provider's network under a plurality of brands, comprising:
   a processor,
   a memory comprising a system memory partition, a user memory partition, and a carrier memory partition;
   an initial OEM stock keeping unit (OEM SKU), wherein the OEM SKU is assigned by an original equipment manufacturer (OEM) based on a device type and a device model;
   a brand stock keeping unit (brand SKU), wherein the brand SKU is subsequently assigned to the portable electronic device in addition to the OEM SKU at the OEM, at a distribution center, or at a point-of-sale location;
   an application stored in the memory that, when executed by the processor, configures the processor to:
   establish a wireless connection between the portable electronic device in a limited communication mode and a network, wherein the limited communication mode allows the portable electronic device to connect to the network;
   receive a brand payload from a data store server in response to powering-on and based on the brand SKU;
   execute the brand payload in response to receiving the brand payload; and
   obtain access to at least one of voice services and data services in response to a determination that the brand payload was received and executed.

2. The portable electronic device of claim 1, wherein the brand payload comprises start-up information, terms and conditions of use, and a user guide.

3. The portable electronic device of claim 1, wherein the limited communication mode restricts service by disallowing other communication.

4. The portable electronic device of claim 1, wherein the network is associated with a telecommunications service provider, wherein the telecommunications service provider supports a plurality of brands.

5. The portable electronic device of claim 4, wherein each brand of the plurality of brands comprises at least one service plan type.

6. The portable electronic device of claim 5, wherein the at least one service plan type comprises a pre-paid service plan, a pay-as-you-go service plan, a contract service plan, and an international service plan.

7. The portable electronic device of claim 1, wherein the portable electronic device is a personal digital assistant (PDA), laptop computer, personal computer, tablet, or mobile phone.

8. A method of sending brand payloads to a portable electronic device comprising:
   establishing, by a network server on a telecommunications service provider network, a wireless connection to a portable electronic device, wherein the wireless connection is established in a limited communication mode, wherein the limited communication mode allows the portable electronic device to contact emergency services and receive a plurality of payloads from the network server, and wherein the limited communication mode restricts all other communication between the portable electronic device and the server;
   determining, by a brand server on the telecommunications service provider network, a type of a brand stock keeping unit (SKU), wherein the brand SKU is associated with the portable electronic device;
   sending, by the brand server, in response to the determination, a payload comprising a plurality of brand payloads to the portable electronic device over the wireless connection, wherein the brand payload comprises terms and conditions, startup information, and a user guide; and
   granting, by the network server, to the portable electronic device, in response to a determination that the payload was sent and executed, access to at least one of voice services and data services.

9. The method of claim 8, wherein the plurality of brand payloads further comprising a branding payload and a customization payload.

10. The method of claim 8, wherein the server comprises at least one data store comprising pluralities of brand payloads for a plurality of brands associated with a telecommunications service provider.

11. The method of claim 8, wherein the access to the at least one of voice services and data services is based on a subscription plan associated with the portable electronic device.

12. The method of claim 8, wherein the portable electronic device is a personal digital assistant (PDA), laptop computer, personal computer, tablet, or mobile phone.

13. A method of sending brand payloads to a portable electronic device comprising:
   establishing, by a server, a wireless connection to a portable electronic device, wherein the wireless connection is established in a limited communication mode, wherein the limited communication mode allows the device to connect to emergency services and receive a payload from the network;
   determining, by a server, whether a memory of the portable electronic device comprises a brand stock keeping unit (SKU), wherein the brand SKU is associated with a brand of a telecommunications service provider;
   determining, in response to the determination that the memory comprises the brand SKU, a brand associated with the brand SKU;
   sending, by the server, in response to the determination of the brand associated with the brand SKU, a brand payload to the portable electronic device over a wireless network; and
   sending, by the server, in response to the determination that the memory does not comprise the brand SKU, a notification to the portable electronic device.

14. The method of claim 13, wherein the limited communication mode restricts service by disallowing other communication.

15. The method of claim 13, wherein the network is associated with a telecommunications service provider, wherein the telecommunications service provider comprises a plurality of brands.

16. The method of claim 15, wherein the plurality of brands comprises at least one plan type.

17. The method of claim 16, wherein the at least one plan type comprises a pre-paid plan, a pay-as-you-go plan, a contract plan, and an international plan.

18. The method of claim 13, wherein the portable electronic device is a personal digital assistant (PDA), laptop computer, personal computer, tablet, or mobile phone.

19. The method of claim 13, wherein the brand payloads comprises terms and conditions, startup information, and a user guide.

20. The method of claim 13, wherein the notification is sent to at least one of a quality control queue on a different server and a portable electronic device of a supervisor.

\* \* \* \* \*